UNITED STATES PATENT OFFICE.

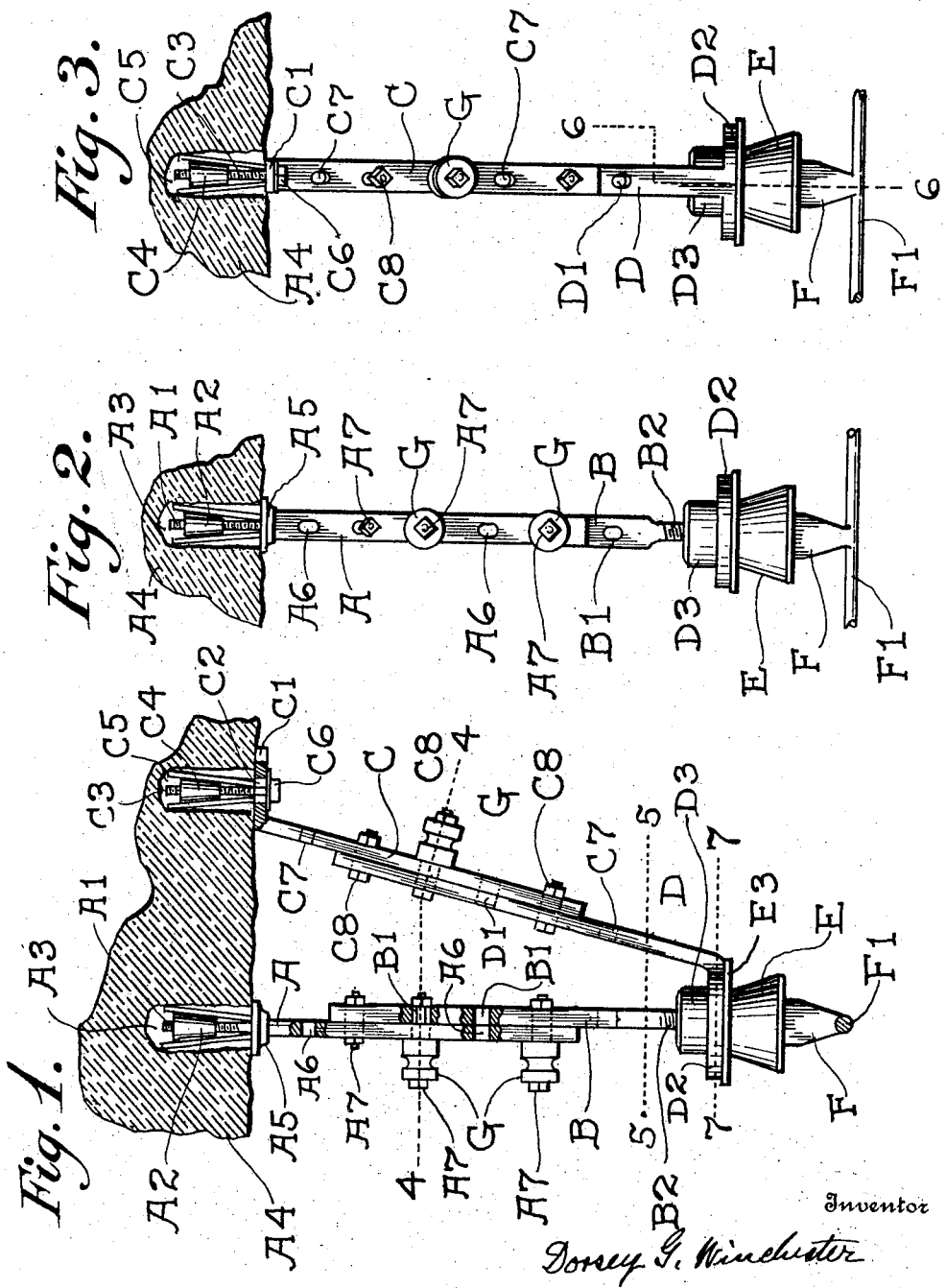

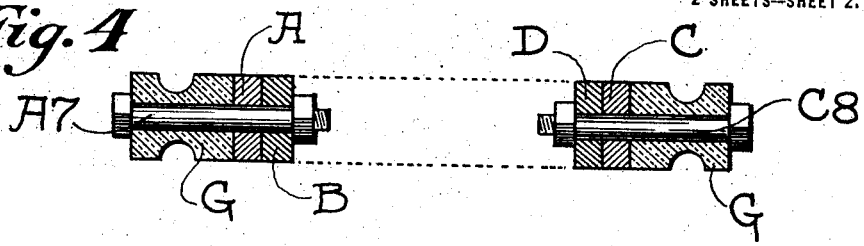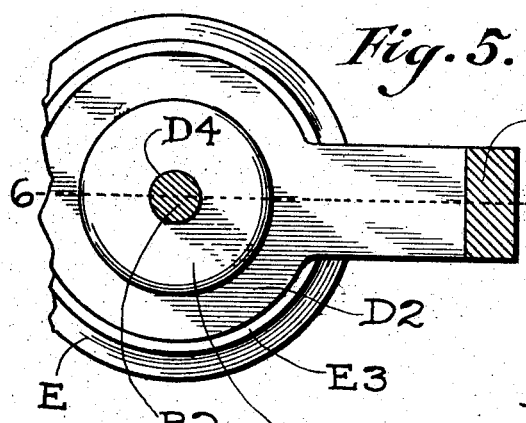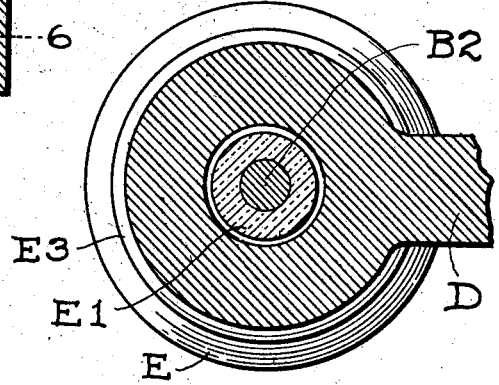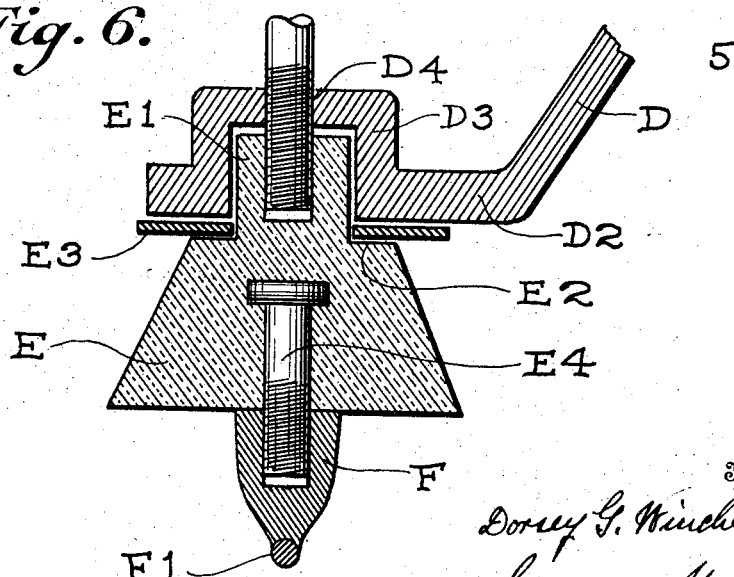

DORSEY G. WINCHESTER, OF PRUDEN, TENNESSEE.

ELECTRIC-CONDUCTOR SUPPORT.

1,314,724. Specification of Letters Patent. Patented Sept. 2, 1919.

Application filed August 19, 1918. Serial No. 250,465.

*To all whom it may concern:*

Be it known that I, DORSEY G. WINCHESTER, a citizen of the United States, residing at Pruden, in the county of Claiborne and State of Tennessee, have invented a new and useful Improvement in Electric-Conductor Supports, of which the following is a specification, reference being had to the accompanying drawing.

My improvement relates particularly to overhead supports for electric conductors, the supports being applied to a ceiling or similar over-head body, for example, a mine tunnel or a rock tunnel, one of the conductors supported by the supports being a trolley wire used for transmitting current to an electric locomotive or an electric car, and it being desirable to suspend the trolley wire at an approximately uniform distance above the track which is to be traversed by such locomotive or car, and it being desirable that the trolley wire be in alinement corresponding to the alinement of the track, in order that the trolley pole rising from the locomotive or car may readily make and maintain contact with the trolley wire.

In addition to carrying such a trolley wire, the support may carry other electric conductors, such as electric lighting wires or telephone wires or signal wires, etc.

On account of variation in height of the ceiling above the track in such situations, it is desirable that such supports be easily adjustable in the upright direction in order that the trolley wire may be placed nearer to or farther from the ceiling for the purpose of attaining uniform height of the trolley wire above the track. My improved support makes provision for such adjustment.

Furthermore, such support must have stability adapting it to resist tendency toward movement transversely to the length of the trolley wire.

In the accompanying drawings,

Figure 1 is an elevation of a support embodying my improvement, the view being parallel to the length of the electric conductors, parts being broken away;

Fig. 2 is an elevation of the same support looking toward the right as shown in Fig. 1;

Fig. 3 is an elevation looking toward the left as shown in Fig. 1;

Fig. 4 is a horizontal section on the line, 4—4, of Fig. 1;

Fig. 5 is a horizontal section on the line, 5—5, of Fig. 1;

Fig. 6 is an upright section on the line, 6—6, of Fig. 5, looking in the direction of the arrow;

Fig. 7 is a horizontal section on the line, 7—7, of Fig. 1.

Referring to said drawings, A and B are sections forming one of the main members of the mechanism. The section, A, has at its upper end a screw-threaded stem, $A^1$, resting in an expansion nut, $A^2$, of any desired or well known form. Said nut is secured in an upright socket, $A^3$, formed in the ceiling, $A^4$. On the section, A, is an annular shoulder, $A^5$, which bears against the ceiling while the stem, $A^1$, draws the nut, $A^2$, downward.

Below the ceiling and the shoulder, $A^5$, the section, A, is flattened or broadened to adapt it to lie flatwise against the upper part of the upright section, B, which overlaps the section, A. The section, A, has apertures, $A^6$, which register with apertures, $B^1$, formed in the section, B. Bolts, $A^7$, extend horizontally through said apertures and serve to bind the sections, A and B, to each other. Any desired number of apertures, $A^6$ and $B^1$, may be formed in said sections. A part of said apertures, preferably those of only one of said sections may be elongated in the upright direction, in order that said sections may be adjusted on each other without removing the bolts, merely the nuts being loosened.

The lower part, $B^2$, of the section, B, is cylindrical and screw-threaded.

Opposite the member composed of the sections, A and B, is an oblique member composed of an upper section, C, and a lower section, D. The section, C, has at its upper end a horizontal arm, $C^1$, which has a slot, $C^2$, extending lengthwise of said arm. An upright bolt, $C^3$, extends upward through said slot and is threaded into an expansion nut, $C^4$, in an upright socket, $C^5$, formed in the ceiling. Below the arm, $C^1$, a head, $C^6$, on the bolt bears upward against the arm, $C^1$. The lower part of the section, C, overlaps the upper part of the lower oblique section, D. The section, C, has apertures, $C^7$, adapted to register with apertures, $D^1$, in the overlapping part of the section, D. Bolts, $C^8$, extend through said apertures and serve to bind said sections to each other. These apertures are to be sufficient in number to permit adjustment of said sections upon each other endwise. The apertures of one of said sections are preferably elongated, in order that such adjustment may be effected without removal of the bolts, the nuts on said bolts being merely loosened. The member comprising the sections, C and D, may be adjusted horizontally toward and from the member comprising the sections, A and B, when the bolt, $C^3$, has been loosened, the arm, $C^1$, slipping along the ceiling on said bolt.

At its lower end, the section, D, is extended laterally to form a foot, $D^2$, in which is an upright socket, $D^3$, extending upward from the bottom of the foot and which has an upper wall in which is an aperture, $D^4$, which is screw-threaded and receives the lower part of the section, B.

An insulation member, E, has a neck, $E^1$, extending upward into the socket, $D^3$, and is threaded around the lower end of the stem, $B^2$, of the section, B. At the base of the neck, $E^1$ the insulation member E, has an annular horizontal shoulder, $E^2$. A horizontal washer, $E^3$, surrounds said neck and rests on said shoulder and is by the latter pressed upward against the member, D. An upright metal stem, $E^4$, has its upper end inserted in the insulation member, E, and the lower end of said stem projects below the insulation member and is screw-threaded.

A metal anchor member, F, is threaded around the lower end of the stem, $E^4$. To the lower end of said anchor member is secured the horizontal trolley wire, $F^1$.

When the support is to be applied to an over-head object, such as a ceiling, the upright section, A, is put into position and secured, with or without the upright section, B, being at the time attached to the section, A. When the section, A, has been secured and the section, B, is applied thereto, the section, B, is adjusted to bring the lower end of its stem, $B^2$, to the desired height, that being done by shifting the section, B, on the bolts, $A^7$, as already described.

The oblique sections, C and D, are then put into position, the section, C, being engaged by the bolt, $C^3$, passing through the slot, $C^2$, of the arm, $C^1$, and the stem, $B^2$, being threaded into the aperture, $D^4$, of the wall of the socket, $D^2$. The more convenient course will be to first thread the section, D, on to the stem, $B^2$, by turning the section, D, around the section, B, and then applying the section, C, to the section, D, and securing said sections to each other by the transverse binding bolts, $C^8$, the bolt, $C^3$, being left retracted far enough to permit moving the arm, $C^1$, horizontally as may be required by the slant of the sections, C and D. When this adjustment has been made, the bolt, $C^3$, is to be turned to move it upward until the arm, $C^1$, has been engaged by the head of the bolt.

When the upright member and the slanting member have been thus secured to the ceiling and to each other, these two members composed of overlapping sections constitute a rigid, depending bracket having its lower end at the desired height and adapted to receive the insulator, E. The neck of the insulator is now inserted into the socket, $D^3$, and screwed on to the lower end of the stem, $B^2$, the washer, $E^3$, being put into position on the neck before the neck is moved upward into the socket. The anchor member, F, may be applied to the insulator before or after the insulator is secured in the socket.

Now the structure is ready to receive the trolley wire, $F^1$, said wire being, as above described, secured to the lower part of the anchor member, F. When thus applied, the trolley wire is at the desired height above the track and is in position to be reached by the upward-directed trolley arm carried by an electric locomotive or an electric car. If the height of the track is afterward changed, the height of the trolley wire may be correspondingly changed by loosening the bolts, C, $A^7$ and $C^8$, and moving the sections, B and D, upward or downward, and moving the sections, C and D, sidewise, as may be required, and then again securing said bolts.

The foot, $D^2$, of the section, D, may be broadened or the washer, $E^3$, may be made of ample diameter to shield the insulator, E, from any falling material.

In addition to the insulator, E, which is to hold the trolley wire, other insulators, G, may be placed on the structure for holding other electric conductor wires, such as telephone wires or electric lighting wires. In the drawings, such insulators are shown secured by bolts, $A^7$ and $C^8$, the bolts being long enough to reach through the overlapping supporting members and the insulators. Any desired number of these bolts may be thus made to support an insulator.

The bracket or support may be adjusted to vary the height of the trolley wire, $F^1$, without detaching the conductor wires supported by the insulators, G.

I claim as my invention,

1. In a mechanism of the nature described, the combination of two extensible members each adapted to have its upper end secured to a ceiling and the lower end of the first of said members extending through the lower end of the second of said members, and an insulator secured to the lower end of the first member, substantially as described.

2. In a mechanism of the nature described, the combination of two extensible members each having its upper end adapted to be secured to a ceiling and one of said members having at its lower end a socket and the lower end of the other member being a screw threaded stem threaded into said socket, and an insulator secured to the lower end of one of said members, substantially as described.

3. In a mechanism of the nature described, the combination of two extensible members each having its upper end adapted to be secured to a ceiling and one of said members having at its lower end a socket and the lower end of the other member being a screw threaded stem threaded into said socket, and an insulator threaded to said stem, substantially as described.

4. In a mechanism of the nature described, the combination of a member having at its lower end a foot in which is a socket extending upward into said foot, a second member extending downward through the wall of said foot into said socket, and a downward-directed insulator extending upward into said socket and there secured to said second member, substantially as described.

5. In a mechanism of the nature described, the combination of two extensible members, one having at its upper end a horizontal slotted arm and having at its lower end a horizontal foot having a socket extending upward from the bottom of the foot and said foot making engagement with the lower end of said other member, and a downward-directed insulator extending upward into and secured in said socket, substantially as described.

In testimony whereof I have signed my name this 12th day of June, in the year one thousand nine hundred and eighteen.

DORSEY G. WINCHESTER.

Copies of this patent may be obtained for five cents each, by addressing the "Commissioner of Patents, Washington, D. C."